United States Patent
Oren et al.

(10) Patent No.: US 11,460,541 B2
(45) Date of Patent: Oct. 4, 2022

(54) METHOD AND SYSTEM FOR DETECTION OF A TARGET BY A PASSIVE RADAR SYSTEM EXPLOITING MULTICHANNEL-PER-CARRIER ILLUMINATOR SOURCES

(71) Applicant: SenStation Technologies Ltd., Hod Hasharon (IL)

(72) Inventors: Menahem Oren, Kadima (IL); Isaac Mushkin, Hod Hasharon (IL); Baroch Oren, Kadima (IL)

(73) Assignee: SENSTATION TECHNOLOGIES LTD., Hod Hasharon (IL)

( * ) Notice: Subject to any disclaimer, the term of this patent is extended or adjusted under 35 U.S.C. 154(b) by 133 days.

(21) Appl. No.: 16/636,931

(22) PCT Filed: Sep. 6, 2018

(86) PCT No.: PCT/IL2018/051002
§ 371 (c)(1),
(2) Date: Feb. 6, 2020

(87) PCT Pub. No.: WO2019/053711
PCT Pub. Date: Mar. 21, 2019

(65) Prior Publication Data
US 2020/0309938 A1    Oct. 1, 2020

(30) Foreign Application Priority Data

Sep. 12, 2017 (IL) .......................................... 254452

(51) Int. Cl.
*G01S 7/35* (2006.01)
*G01S 13/46* (2006.01)
*G01S 13/02* (2006.01)

(52) U.S. Cl.
CPC .............. *G01S 7/354* (2013.01); *G01S 13/46* (2013.01); *G01S 2013/0263* (2013.01); *G01S 2013/462* (2013.01)

(58) Field of Classification Search
CPC .. G01S 13/46; G01S 7/023; G01S 2013/0263; G01S 2013/462
(Continued)

(56) References Cited

U.S. PATENT DOCUMENTS 6,703,968 B2 * 3/2004 Baugh ................... G01S 13/878
                                                                 342/55
6,930,638 B2 * 8/2005 Lloyd .................... G01S 13/583
                                                                342/461
(Continued)

FOREIGN PATENT DOCUMENTS

CN    103308934 A    9/2013
CN    203606490 U    5/2014
(Continued)

OTHER PUBLICATIONS

James Randerson, Cellphone 'radar' tracks traffic flow, Article, Oct. 27, 2003, 7 pages.

*Primary Examiner* — Bernarr E Gregory
*Assistant Examiner* — Nuzhat Pervin
(74) *Attorney, Agent, or Firm* — Mark M. Friedman (57) ABSTRACT

A method and system for detection of a target by a passive radar system exploiting multichannel-per-carrier cellular illuminator sources, the method including: receiving a reference signal from a reference source, said reference signal being received at a reference element of a radar receiver of the passive radar system; receiving, at a surveillance element of said radar receiver, a reflected signal originating from said reference source and reflected off the target, said reflected signal including interference; deciphering components of
(Continued)

said signals; and reconstructing said signals, from said components, excluding said interference.

11 Claims, 8 Drawing Sheets

(58) Field of Classification Search
USPC .......................................................... 342/61
See application file for complete search history.

(56) References Cited

U.S. PATENT DOCUMENTS

| | | | | |
|---|---|---|---|---|
| 7,277,052 B2* | 10/2007 | Delaveau | ................ | G01S 7/352 |
| | | | | 342/464 |
| 7,635,889 B2* | 12/2009 | Isa | ................ | H01L 27/124 |
| | | | | 257/249 |
| 8,309,976 B2* | 11/2012 | Yamazaki | ........... | H01L 27/3244 |
| | | | | 257/E31.09 |
| 8,601,427 B2* | 12/2013 | Kawagoe | ............... | H03K 5/133 |
| | | | | 716/135 |
| 8,902,102 B2* | 12/2014 | Goodson | ............... | G01S 13/003 |
| | | | | 342/29 |
| 9,006,043 B2* | 4/2015 | Ohnuma | ............. | H01L 27/1214 |
| | | | | 438/153 |
| 9,768,239 B2* | 9/2017 | Yamazaki | ........... | H01L 51/5221 |
| 10,142,822 B1* | 11/2018 | Zalewski | .............. | H04W 76/10 |
| 10,177,947 B2* | 1/2019 | Agee | ...................... | H04W 52/52 |
| 10,551,493 B2* | 2/2020 | Bialer | ..................... | G01S 13/42 |
| 2002/0167440 A1* | 11/2002 | Baugh | .................. | G01S 13/003 |
| | | | | 342/107 |
| 2005/0285787 A1* | 12/2005 | Delaveau | ................ | G01S 7/352 |
| | | | | 342/464 |
| 2011/0128181 A1* | 6/2011 | Galati | ................. | G01S 13/0209 |
| | | | | 342/107 |
| 2011/0217962 A1* | 9/2011 | Leung | .................. | G01S 13/878 |
| | | | | 382/103 |
| 2013/0156009 A1* | 6/2013 | Dinan | .................. | H04B 7/0617 |
| | | | | 370/332 |
| 2015/0318881 A1* | 11/2015 | Barott | ................. | H04L 27/0012 |
| | | | | 375/285 |
| 2016/0259041 A1* | 9/2016 | Tan | ........................ | G01S 13/003 |
| 2017/0026205 A1* | 1/2017 | Agee | ................. | H04L 27/26414 |
| 2017/0031013 A1* | 2/2017 | Halbert | .................... | G01S 7/414 |
| 2021/0092562 A1* | 3/2021 | Markhovsky | ......... | G01S 5/0273 |
| 2021/0400630 A1* | 12/2021 | Shi | ......................... | H04W 8/205 |

FOREIGN PATENT DOCUMENTS

| | | | | |
|---|---|---|---|---|
| CN | 104898112 A | | 9/2015 | |
| DK | 201370590 A1 | | 4/2015 | |
| EP | 2318857 B1 | * | 10/2013 | .......... G01S 13/003 |
| WO | 2015051814 A1 | | 4/2015 | |
| WO | WO-2018160141 A1 | * | 9/2018 | ............... G01S 3/74 |

* cited by examiner

METHOD AND SYSTEM FOR DETECTION OF A TARGET BY A PASSIVE RADAR SYSTEM EXPLOITING MULTICHANNEL-PER-CARRIER ILLUMINATOR SOURCES

FIELD OF THE INVENTION

The present invention relates to passive radar and, more particularly, to a system for passive radar based on cellular, multi-channel per carrier transmission sources (also known as Single Frequency Networks—SFN) such as 3rd generation (UMTS) or 4th generation cellular transmission protocols.

BACKGROUND OF THE INVENTION

Passive radars known in the art generally exploit illuminator sources such as VHF FM radio signals, UHF analogue TV signals, digital audio and TV broadcasts.

There are very few systems for passive radar based on cellular signals known in the art. Such are GSM based (2G) systems suited for single channel per carrier transmissions that cannot work with transmissions in multichannel per carrier environments. Frequency re-use causes a situation in which adjacent cell transmission sources create interference which renders the prior art systems inapplicable.

SUMMARY OF THE INVENTION

The immediate invention provides an innovative system that solves the problem of frequency re-use interference by using innovative interference removal techniques detailed herein.

Interference removal is achieved by employing one or more of the following: (1) Reference antenna directivity; (2) "CLEAN" algorithm for cancellation of direct reference interference; and/or (3) Specific algorithms for suppression of interfering transmissions and conditioning of the reference signal in the Field of View (FOV). Unlike the first two steps, and ordinary prior art systems, which filter out noise and interference from the received signals and use the residual information, the specific algorithms are based on deciphering the transmitted signals from the received signal and reconstructing the orderly signal in a bottom-up manner.

According to the present invention there is provided a method for detection of a target by a passive radar system exploiting multichannel-per-carrier cellular illuminator sources, the method including: receiving a reference signal from a reference source, said reference signal being received at a reference element of a radar receiver of the passive radar system; receiving, at a surveillance element of said radar receiver, a reflected signal originating from said reference source and reflected off the target, said reflected signal including interference; deciphering components of said signals; and reconstructing said signals, from said components, excluding said interference.

According to further features in preferred embodiments of the invention described below the steps of deciphering and reconstructing include: filtering said reference signal using Space Time Adaptive Processing (STAP) algorithms to receive a selective reference channel; applying a Conditioning algorithm to obtain a clean reference cell signal replica, with interfering signals and multipaths of said interfering signals removed, resulting in a conditioned signal; filtering said reflected signal using said STAP algorithms; removing direct interference from said reflected signal, with a Clean algorithm using said conditioned signal, said conditioned signal being passed through a filter representing a transfer function between said reference element and said surveillance element, and subtracting a resulting signal from said reflected signal; and reconstructing said surveillance signal by successively subjecting said reflected signal to at least one iteration of a Suppression algorithm, resulting in a refined reflected signal.

According to still further features in the described preferred embodiments the method further includes performing a Cross Ambiguity Function (CAF) between a refined reference signal and said conditioned signal, resulting in a Range Doppler Image for every reception dwell; estimating the Angle of Arrival (AOA) of the target, in azimuth and elevation, using amplitude and phase of same pixel in different channels of said reflected signal, said estimating only being executed on pixels extracted by a Constant False Alarm Rate (CFAR) mechanism; applying a Track Before Detect (TBD) algorithm to the target; establishing Plot reports; and obtaining location and velocity estimates; displaying said plots.

According to still further features the Conditioning algorithm includes the steps of: fitting a Down Link Scrambling Code (DLSC) to said reference signal; correcting a receiver Local Oscillator to an interfering cell carrier frequency; estimating a transfer function of a medium interposed between an input of a transmitter of said reference source and an output of said radar receiver of the passive radar system; reconstructing a source signal, said source signal being a signal originally transmitted from said reference source; and transforming said reconstructed source signal by said estimated transfer function, thereby obtaining an estimate of said reference signal, wherein said estimate is said conditioned signal.

According to still further features the DLSC is found by detecting a Primary Synchronization Code (PSC) and a Secondary Synchronization Code (SSC) and inferring said DLSC from said SSC sequence. According to still further features the DLSC can be dictated from an external knowledge base.

According to still further features the reconstructing said source signal includes: determining active Orthogonal Variable Spreading Factor (OVSF) channels; estimating and reconstructing symbols of said channels; and adding reconstructed synchronizations.

According to still further features the Suppression algorithm includes the steps of: fitting a Down Link Scrambling Code (DLSC) to said reference signal; correcting a receiver Local Oscillator to an interfering cell carrier frequency; estimating a transfer function of a medium interposed between an input of a transmitter of said reference source and an output of said radar receiver of the passive radar system; reconstructing a source signal, said source signal being a signal originally transmitted from said reference source; transforming said reconstructed source signal by said estimated transfer function, thereby obtaining an estimate of said interfering signal; subtracting said estimate of said interfering signal from an input residual signal in order to establish a new residual signal; checking whether all DLSCs have been used, such that if all said DLSCs have been used, said new residual signal is said output of said radar receiver, otherwise, change DLSC to an unused DLSC and perform said Suppression algorithm again with said new residual signal.

According to still further features reconstructing said source signal comprises: reconstructing a Primary Synchronization Code (PSC), a Secondary Synchronization Code (SSC) and a Common Pilot Channel (CPICH) by: constructing each of said PSC, SSC and CPICH using a known algorithm such that a number of samples per chip accords with a sampling rate, synchronizing each of said PSC, SSC and CPICH with said input residual signal or new residual signal by locating a maximal correlation between each of said PSC, SSC and CPICH and said received signal, and duplicating each of said PSC, SSC and CPICH to a same length of said residual signal; passing said reconstructed PSC, SSC and CPICH components through said estimated transfer function, in order to translate said reconstructed components at an input of said reference source to an output of said radar receiver; subtracting said reconstructed signals, estimated at said output of said radar receiver, from said input residual signal; descrambling said received signal or said input residual signal; despreading said received signal; extracting a data signal from said despreaded signal; reconstructing a component signal associated with a channelization code so as to receive a spreaded reconstructed signal; scrambling said spreaded reconstructed signal by chip-wise multiplication of a DLSC constructed in said despreading step; repeating reconstruction of said spreaded components for all valid channelization codes; accumulating said reconstructed signal components so as to return an estimate of said source signal at said input of said reference source According to still further features the LO correction is achieved by fitting a complex sinusoid to a Common Pilot Channel (CPICH) signal or equivalent thereof, and correcting said signal received from said interfering cell by an estimated frequency of said fitted complex sinusoid.

According to another embodiment there is provided a passive radar system configured to exploit multichannel-per-carrier cellular illuminator sources, the system including: a radar receiver including: a reference antenna element configured to receive a reference signal from a reference source, and a surveillance antenna element configured to receive a reflected signal originating from said reference source and reflected off a target, wherein said reflected signal includes interference; and a signal processor configured to analyze said received signals and perform and computations to decipher components of said received reference and reflected signals in order to identify said interference and reconstruct said signals from said components, without said interference.

The terms "Passive Coherent Location (PCL)" and "passive radar", as used herein, refer to a passive radar system, where there is no dedicated transmitter. Instead, the receiver uses third-party transmitters in the environment, and measures the time difference of arrival between the signal arriving directly from the transmitter and the signal arriving via reflection from the object. This allows the bi-static range of the object to be determined. In addition to bi-static range, passive radar will typically also measure the bi-static Doppler shift of the echo and also its direction of arrival. These allow the location, heading and speed of the object to be computed. In some cases, multiple transmitters and/or receivers can be employed to make several independent measurements of bi-static range, Doppler and bearing and hence significantly improve the final track accuracy.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Radar systems infer the environment by analyzing signals which are reflected from objects in the surveyed environment and are collected by the radar receiver. Radars which create the waves and emit them towards the environment are termed active radars, whereas, radars that exploit waves from non-cooperative sources are termed passive radars.

There is described herein a Passive Radar (PR) system, which exploits UMTS and/or 4th generation (LTE) and/or newer generation cellular communications and/or WiFi as the wave source which illuminates the environment. Collectively, the source of the reference signal—be it a Base Transceiver Station (BTS), a WiFi router or any other relevant transmission source—is termed herein the "reference source" or variations thereof.

In general, passive radar using cellular transmissions that are known in the art relate to—and are only effective for—GSM or $2^{nd}$ generation to 2.5 Generation cellular transmissions. GSM transmissions use a narrower bandwidth than the UMTS bandwidth. Due to the use of the relatively narrow bandwidth, GSM mobile phones were able to differentiate between adjacent base stations based on frequency. A first BTS would transmit on one frequency and the adjacent BTSs would all transmit on other frequencies, so that the mobile phone would know which BTS it is communicating with. The GSM method of cellular transmission made it relatively easy for passive radar to identify the reference transmission. By knowing the frequency of the BTS, the passive radar would be able to identify where the particular transmission was coming from and hence know the distance (and other details) from the radar antenna to the reference transceiver. Identifying the transmitter of the reference signal is essential for calculating the location of the tracked object.

UMTS, and later protocols, have a broader bandwidth. With the broader bandwidth, there are not enough frequencies for adjacent BTSs to each have a different frequency. As a result, UMTS, generations 3.5, 4 and later, re-use frequencies, so that adjacent BTSs can be using the exact same frequency. As a result, a new method for distinguishing BTSs was developed.

Each cellular transmission includes a code which informs the mobile cellular device which BTS the signal is coming from. When the device moves from one BTS to another BTS, the transmission includes the code of the new BTS. As a result, it is extremely difficult for passive radar to distinguish between signals. To do so, the passive radar has to delve down into (deconstruct) each signal and find the code or code-based data that indicates which BTS the signal originated from.

The disclosure includes and describes a method for refining the illuminating signal which arrives directly from the illuminator and the signals reflected from targets when illuminated, by means of deciphering the components of the signals, and reconstructing the signals from their components. Thereby, the signal to interference ratio, which is regarded as a cardinal challenge in such systems, is improved.

The principles and operation of a Passive Radar system according to the present invention may be better understood with reference to the drawings and the accompanying description.

Figure 1:
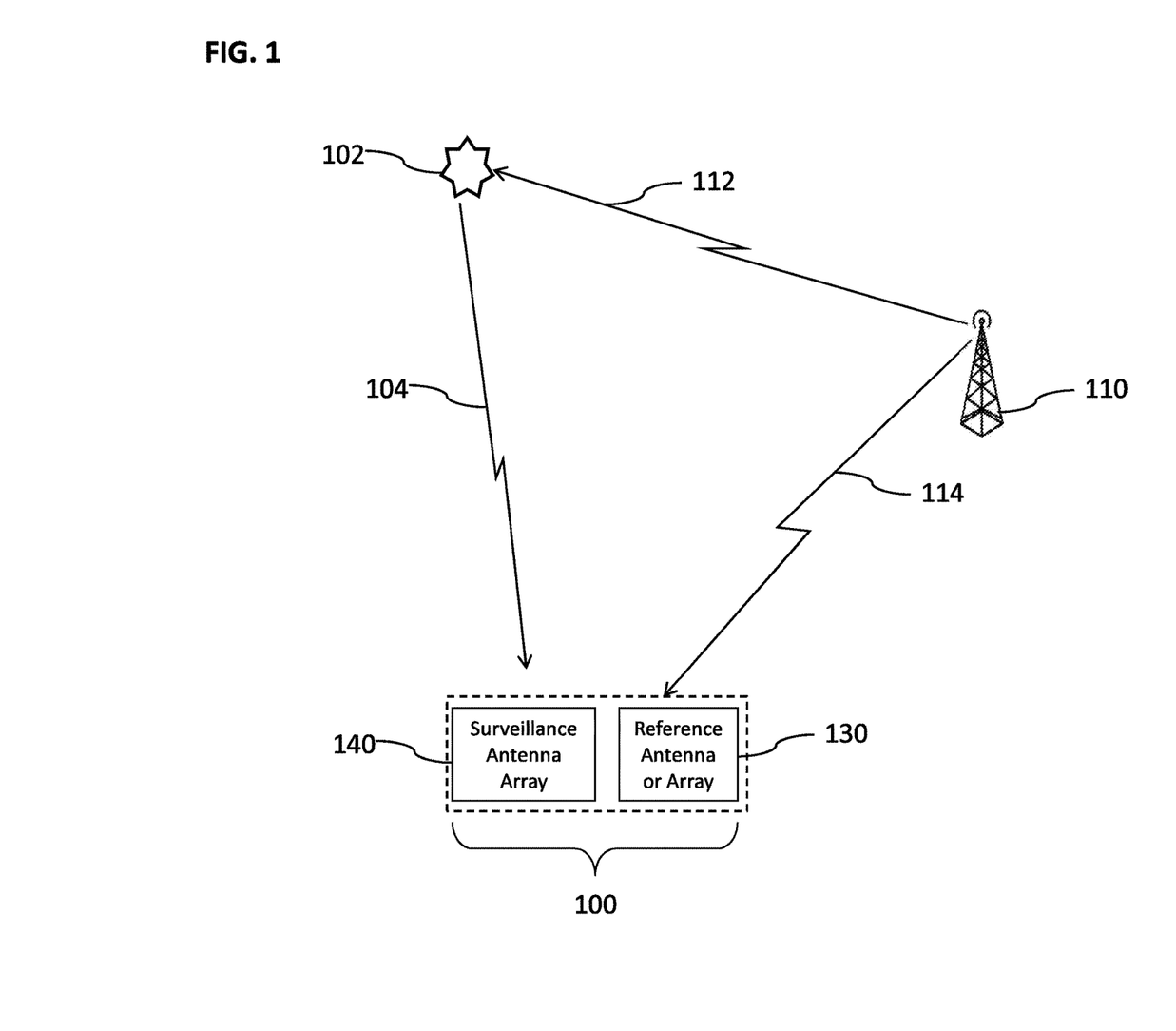
FIG. 1 is a concept description of PCL topology.

Referring now to the drawings, FIG. 1 is a concept description of PCL topology. A selected sector of base station down link 110 is used as a "Reference Signal (REF)" 114 intercepted by the PCL system via the system reference antenna array 130 ("Reference Antenna Array" or "Reference Antenna" or variations thereof). The same sourced signal emission 112 illuminates a "Target" 102 and the back-scattered signal (also referred to herein as a "reflected signal") is received by the PCL system via the system FOV antenna array 140 ("Surveillance Antenna Array" or "Surveillance Antenna" or variations thereof) as "Field Of View Targets Signals (FOV)" 104.

The aforementioned configuration follows the preferred (and common) practice to separate the reference and the surveillance devices (each might be a single antenna or an array of antennas). However, according to less preferred embodiments, a single antenna (or array) is used for receiving both reference and surveillance signal, often at the cost of reduced performance. The term "radar receiver" refers collectively to the Reference and Surveillance antennas, antenna array or antenna arrays. The surveillance component (antenna, array, etc.) of the radar receiver is referred to as the surveillance element of the radar receiver and the reference component of the radar receiver is referred to as the reference element of the radar receiver.

The "Target" could be any object of interest in the FOV whose dominant back-scatters have specifiable behavior profile over time of bistatic range, bistatic Doppler, Angle Of Arrival and Amplitude measurements (multiple samples every dwell time observation).

A signal processor (not shown) or computer processor configured for signal processing is used to analyze the received signals and perform the logic and mathematical computations in order to decipher the components of the received (reference, reflected) signals, identify the interference (interfering signals, multipaths thereof, and clutter) and reconstruct the signals from the components, without the interference. The processing unit (the term processing unit refers to any type of processing unit including one or more microprocessors and related hardware known in the art for signal processing) is adapted and configured to perform all of the functions and processes detailed in the present disclosure.

The figure illustrates an arrangement of a transmitter (cellular source), a target and antenna arrays of a passive radar system of the immediate invention. The PR system 100 of the immediate invention is composed of Reference Antenna Array 130, Surveillance Antenna Array 140 and the constituents of FIG. 3.

Figure 3:
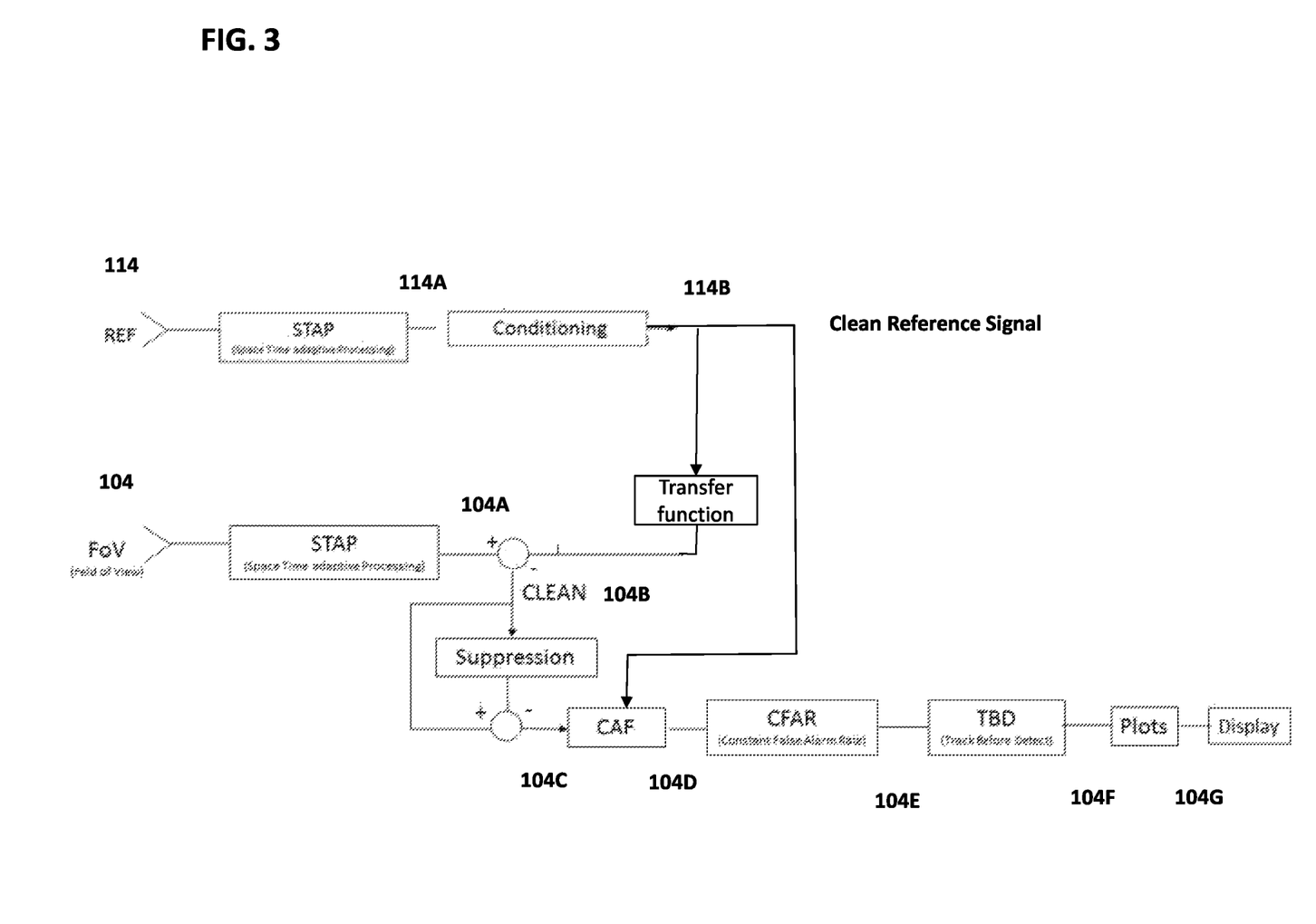
FIG. 3 is a general architecture of PCL system.

FIG. 3 depicts a general architecture of PCL system. The FOV signals from the antenna array elements feed receiver channels that are filtered by time and space STAP (Space Time Adaptive Processing) algorithms to receive a selective reference channel, that is to say, to become 104A selective in frequency and Angle Of Arrival (AOA) in azimuth and elevation on the targets of interest. A similar STAP process is applied on the REF antennas of the REF array forming a selective channel 114A. This signal undergoes "Conditioning" algorithm to obtain 114B, a clean reference cell signal replica where interfering signals and multipaths do not exist if the conditioning operation is perfect, or exist to some small extent if the conditioning operation is sub-optimal. Innovatively, the system does not remove the interference from the received signal, but rather reconstructs the signal without the interference.

The 114B signal is used to remove the direct interference from the channels of the FOV signals using "Clean" algorithm as commonly known in the art, while passing the 114B signal through a filter representing the transfer function between the reference antenna and the surveillance antenna, and subtracting the resulting signal from the 104A signal. The resulting signals 104B undergo successive iterations of "Suppression" algorithm to reconstruct the surveillance signals without the interfering cells signals. The resulting signal is a refined (or purified or pure) signal.

Resulting FOV channels 104C contain essentially only scattering signals from targets and clutter. A Cross Ambiguity Function (CAF) is performed between 104C channels and the clean reference signal 114B resulting in Range Doppler image 104D for every reception dwell. The amplitude and phase of same pixel in different FOV channel are used to estimate targets AOA in azimuth and elevation using standard techniques (such as amplitude comparison, interferometry, MUSIC algorithm, steering beams former etc.). The estimation is only executed on extracted pixels by Constant False Alarm Rate (CFAR) mechanism 104E. CFAR combines clutter map masking, background scattering and noise thresholding and focusing on point targets. In order to further reduce false alarms caused by non-relevant back-scatterers and multipaths of intended targets, a Track Before Detect (TBD) algorithm is applied on tentative targets. The TBD confirms consistency of successive dwells information with expected behavior of valid targets 104F. Resulting target data, including estimates of 3D geo-location and 3D velocity vector establish Plot reports 104G. Location and velocity estimates are obtained from AOA and bistatic range measurements or by using 3 or more REF cell sources applying multilateration algorithms on bistatic range and Doppler velocity measurements. Plots are displayed locally and are communicated to central fusion station.

Figure 4:
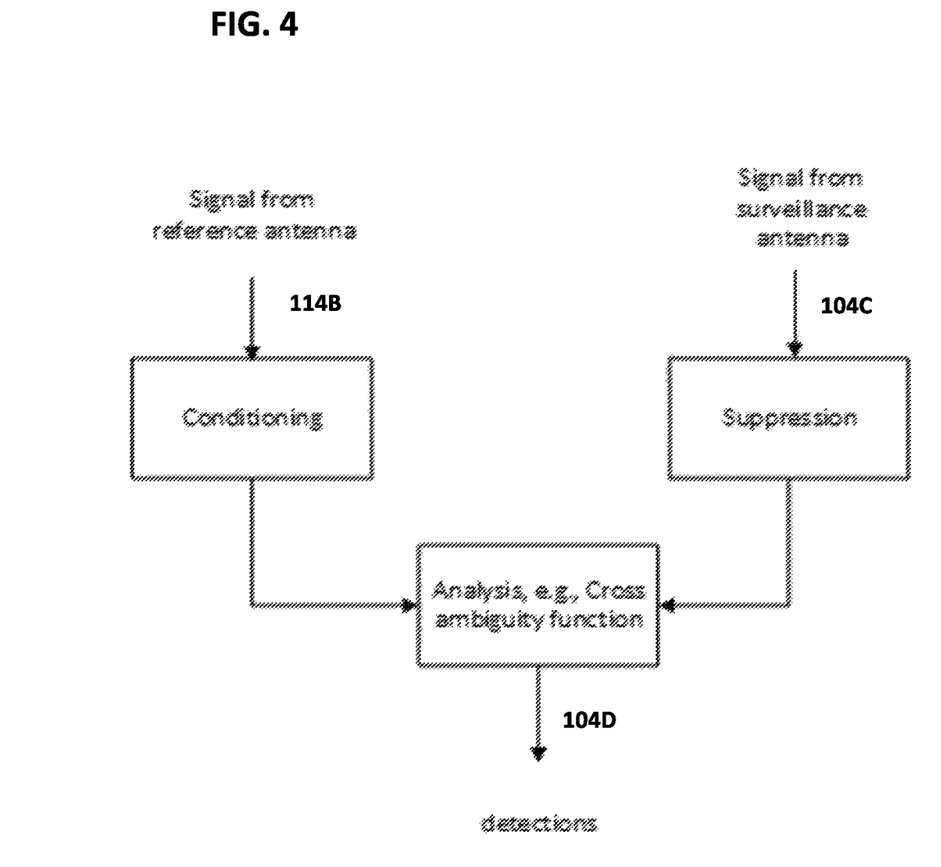
FIG. 4 is a diagram of the CAF mechanism 104D of FIG. 3.

FIG. 4 illustrates the CAF mechanism 104D of FIG. 3. The Conditioning and Suppression algorithms use common functions and will be jointly described. In the following figures these algorithms are described using the example of UMTS 3G.

The performance of passive radar is heavily dependent on the purity of the reference signal. Purity of the reference signal refers to the content of the reference signal transmitted from the transmission source (e.g., a cellular base-station, BTS) compared with the content of other signals, which are termed interference. In a similar fashion, in order to detect a target, it is necessary to distinguish the reflected signal 104 that is reflected off the target 102 from other signals that are received by the surveillance antenna 140.

However due to the practice of 'frequency reuse' in current cellular communications (e.g., in UMTS BTS deployment), neighboring cells often operate on the same frequency band. As such, both reference signals 114 and target/surveillance signals 104 are often contaminated by signals from other base-stations or from other sources. It is very difficult to separate the signals in the time or in the frequency domain. The immediate innovative system is specifically adapted to be able to track objects using transmissions from the BTS that is using UMTS or $3^{rd}$ generation transmissions and higher.

Figure 2:
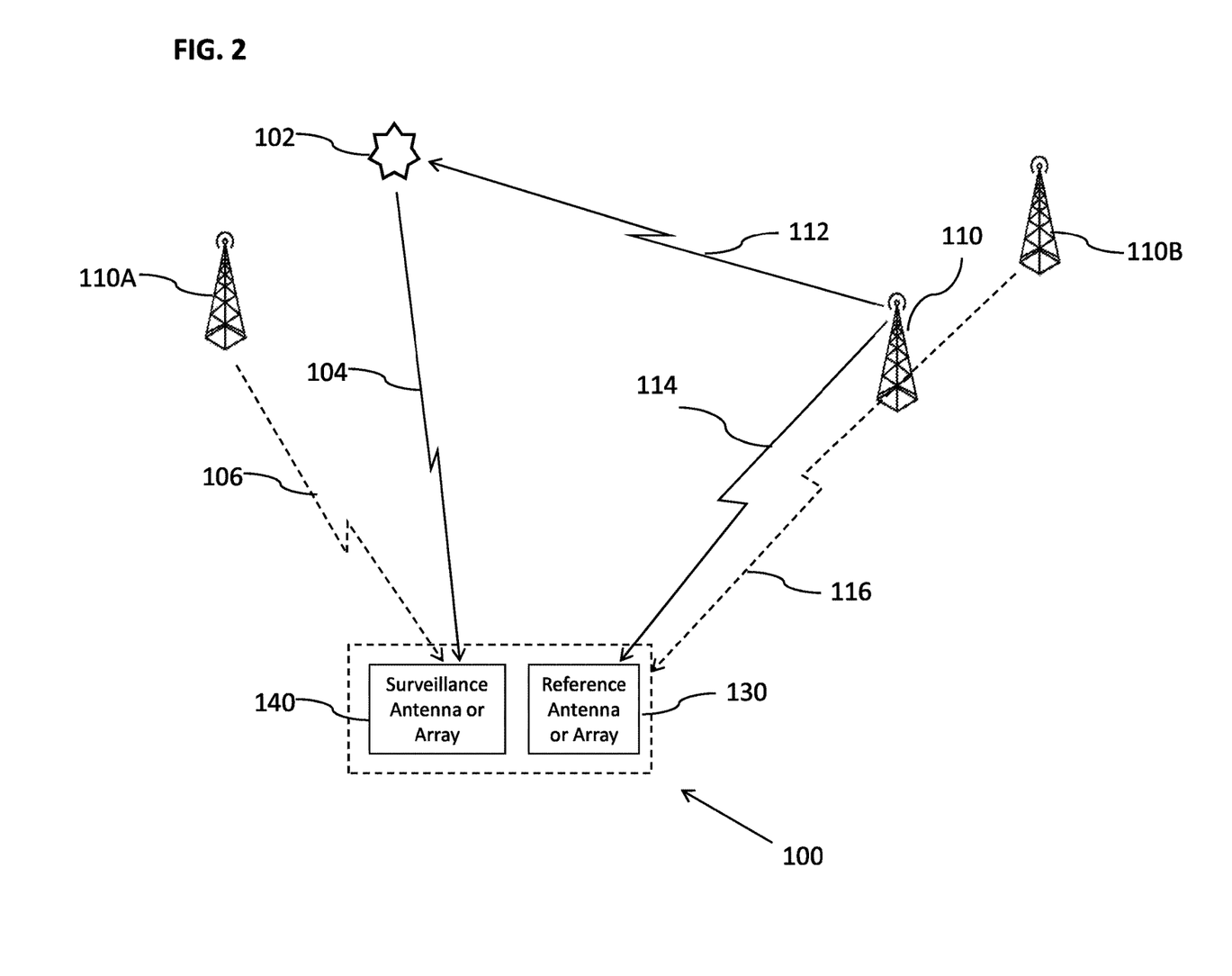
FIG. 2 is a schematic diagram of system 100 together with interference signals 106, 116 from nearby BTSs 110A, 110B.

FIG. 2 illustrates a schematic diagram of system 100 together with interference signals 106, 116 from nearby BTSs 110A, 110B. The illustration is an example of other cells transmissions 110A, 110B that are received by the PCL antennas as interference signals 106, 116 on the same carrier frequency as the reference signal, as well as on other carriers (that are effectively removed by PCL frequency selectivity). The interference signals might have different azimuth (110A) thereby can be partially eliminated by antenna directivity, or have similar azimuth (110B) and cannot be resolved by other prior arts systems.

Interference from other cellular base-stations can affect the reference antenna, the surveillance antenna or both. BTS 110A provides an interference signal 106 to the surveillance signal 104. BTS 110B provides an interference signal 116 to the reference signal 114. The simplified diagram provides a basic representation of interference signals. It is clear that more than one BTS and more than one signal can interfere with surveillance and/or the reference signals.

Each base transceiver station covers a given area, and any object in that area, no matter whether the object be moving towards the BTS, away from it, parallel or perpendicular to the BTS, the object can be tracked in an equal manner. That is to say that the immediate system tracks objects entering the FOV of the surveillance antenna.

The immediate innovative system is able to track an object by passively receiving a reference signal from even a single, terrestrial based transmission source and the signal reflected off the target object. The signal can be a cellular transmission signal, such as a $3^{rd}$ generation (3G) cellular transmission and later generation cellular transmissions.

The immediate invention refers to 3G and later generation, such as 4G (LTE), cellular transmissions, WiFi and WiMAX transmissions.

Interference removal can be achieved by employing one or more of the following: (1) Reference antenna directivity: the directivity of the antenna is a measure of how 'directional' an antenna radiation pattern is. An antenna can be designed and fabricated in a way that the signals received from a specific, often narrow, direction are significantly amplified, with respect to the signals received from other directions. This way, pointing a directive antenna to the source of the reference signal (for example, a reference BTS), might mitigate interference from directions which differ from the direction of the reference transmission source. However, interference from the same direction, for example, a BTS located on or near the line connecting the radar and the reference BTS cannot be resolved this way. Moreover, directional antenna cannot resolve the interference to the reflected signal as the direction of the target is unknown at this stage of the detection.

(2) "CLEAN" algorithm for cancellation of direct reference interference; and (3) Specific algorithms for suppression of interfering transmissions in the Field of View (FOV). Unlike the first two steps, and ordinary prior art systems, which filter out noise and interference from the received signals and use the residual information, the specific algorithms, as is described later in depth, are based on estimating each of the reference and reflected signals, by deciphering the signal to its components, and averaging each component across individual symbols. Once each of the signals composing the received signal is estimated, the transmitted signal is reconstructed. This reconstruction represents the signal at the input of the BTS, and applying the transfer function of the medium between the transmitter input and the radar receiver output, gives an interference-free estimation of the transmitted signal.

There are three problems to solve when dealing with cellular PR.

Firstly, the system needs to identify the source of the transmission, known as the reference signal. Knowing where the transmission originates allows the system to compute where the object is.

Secondly, the system has to sift through a great deal of clutter. Radar that is skyward facing is relatively clutter-free. The skies generally have birds and planes, the latter being the objects to track and the former being relatively easy to identify. When the radar is downward facing, the story is completely different. Cellular transmissions reflect off everything: buildings, the ground, people, trees with lots and lots of moving leaves and so on. All of these reflected signals are considered "clutter" which obscure or hide the signal that is reflected off the object that is being tracked. It is necessary to remove all of the clutter in order to focus on the tracked object.

Thirdly, multipath might degrade the radar performance, as either the reference and/or the reflected signals arrive at the radar antenna from several directions simultaneously, often with unknown delays between each direction. This is because the signal is propagated from the BTS or the target in a broad beam shape, that is, toward a wide sector of the environment. In addition to the direct path from the BTS to the antenna or from the target to the antenna, some of the emitted energy might impinge on objects such as terrain features, trees and buildings and indirectly arrive at the antenna through a path which is longer than the direct one, and often from a different direction.

Figure 5:
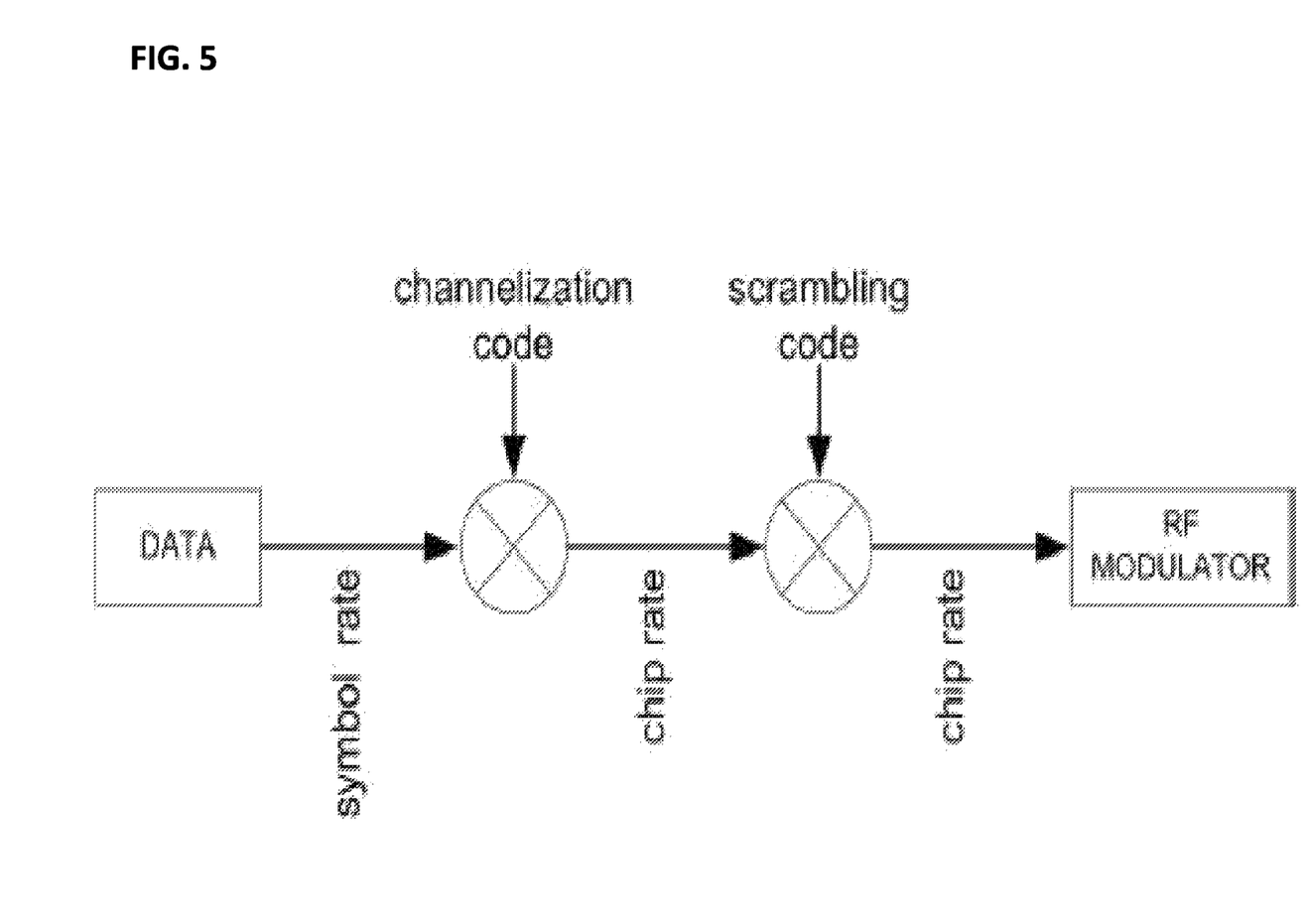
FIG. 5 is a diagram that depicts the coding and modulation flow of a data or control UMTS physical down link channel.

A transmitted signal is composed of tens to hundreds of signals. Some of the signals are control signals and some are data signals. All the signals are summed up before being transmitted through the transmitter. FIG. 5 illustrates a diagram describing the coding and modulation flow of a data or control UMTS physical down link channel; (detailed definition in 3GPP Technical Specifications and Procedures). The data is in form of symbols signal (I/Q vector) representing QPSK or QAM16 or QAM64 modulation of serial bit stream. The bit stream is a Forward Error Correction (FEC) code transform of information bit stream. The symbols are multiplied by a real binary code sequence of SF (Spreading Factor) times the symbol rate to synchronize with the chip rate. The SF can take the values 4, 8, 16, 64, 128, 256, 512. For each value SF there are SF possible codes. The code is called channelization code being Orthogonal Variable Spreading Factor (OVSF). It is assigned to a physical channel. The signal is further multiplied by a scrambling complex code over every transmission frame (10 msec). The Down Link Scrambling Code (DLSC) is unique to a base station cell. The signal is pulse shaped by the modulator.

Figure 6:
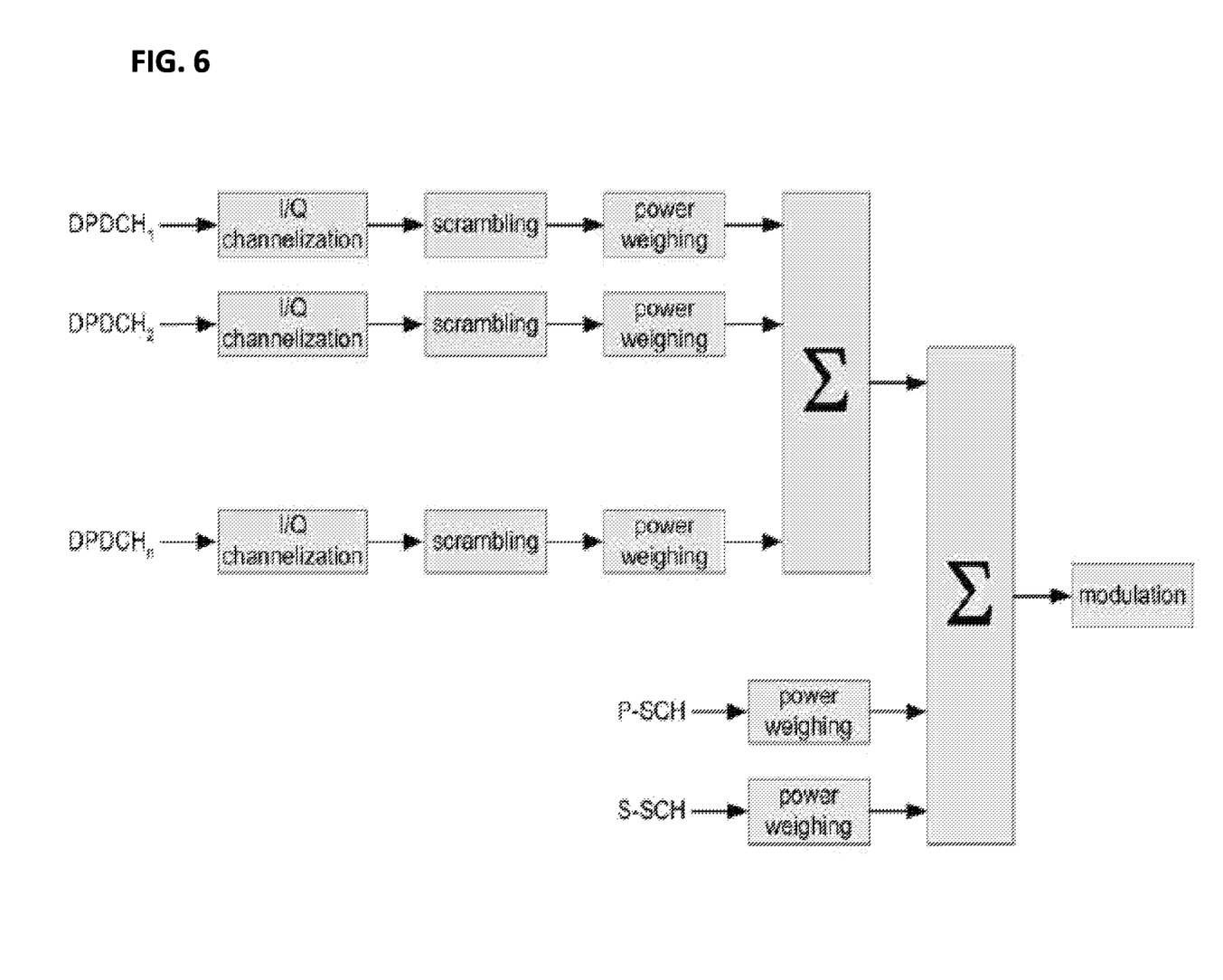
FIG. 6 is a diagram that depicts the construction of UMTS down link transmission signal.

The UMTS signal is organized in frames with a length of 10 ms. Each frame consists of 15 slots and each slot contains 2560 chips. The transmitted data contains anywhere from tens to hundreds of types of signals stacked upon each other. As can be seen in FIG. 6, the Dedicated Physical Data CHannels (DPDCH) are stacked one on top of the other. Some of signals are control signals which are used to maintain the physical layer of the cellular communication (e.g., gain control, synchronization and error correction auxiliary signals), and some of them are the data signals which carry, for example, the voice signals.

Some of the signals are coded using several well documented methods such as channelization and scrambling. FIG. 6 depicts an exemplary coding process which is composed of spreading (or channelization) and scrambling. Other signals, often control signals which are used for synchronization, are not coded at all. The signals then undergo power balancing to optimize the transmission of each signal to its destination, and then summed up synchronously. The result is modulated and transmitted through the cellular base-station transmitter. The diagram in the FIG. 6 describes the construction of UMTS down link transmission signal (detailed definition in 3GPP Technical Specifications and Procedures). Multiple data and control channels are multiplexed to get common DLSC multiplication. Synchronization signals are added: Primary Synchronization Code (PSC) and Secondary Synchronization Code (SSC). Their decode at the receiver enables detection of DLSC value and synchronization to the cell transmission frames. A pilot signal which is broadcasted in SF 256 CH 0 enables phase synchronization and channel estimation at the receiver side.

One objective of the immediate system is to construct a refined reference signal and a refined surveillance signal so as to improve the signal to interference ratio, and to facilitate detection of targets which are originally buried below the noise level.

At least for the purposes of the immediate disclosure, the terms used for the refined signals are as follows: 'conditioned signal' refers to a refined reference signal, and 'suppressed signal' refers to a refined surveillance signal.

Figure 7:
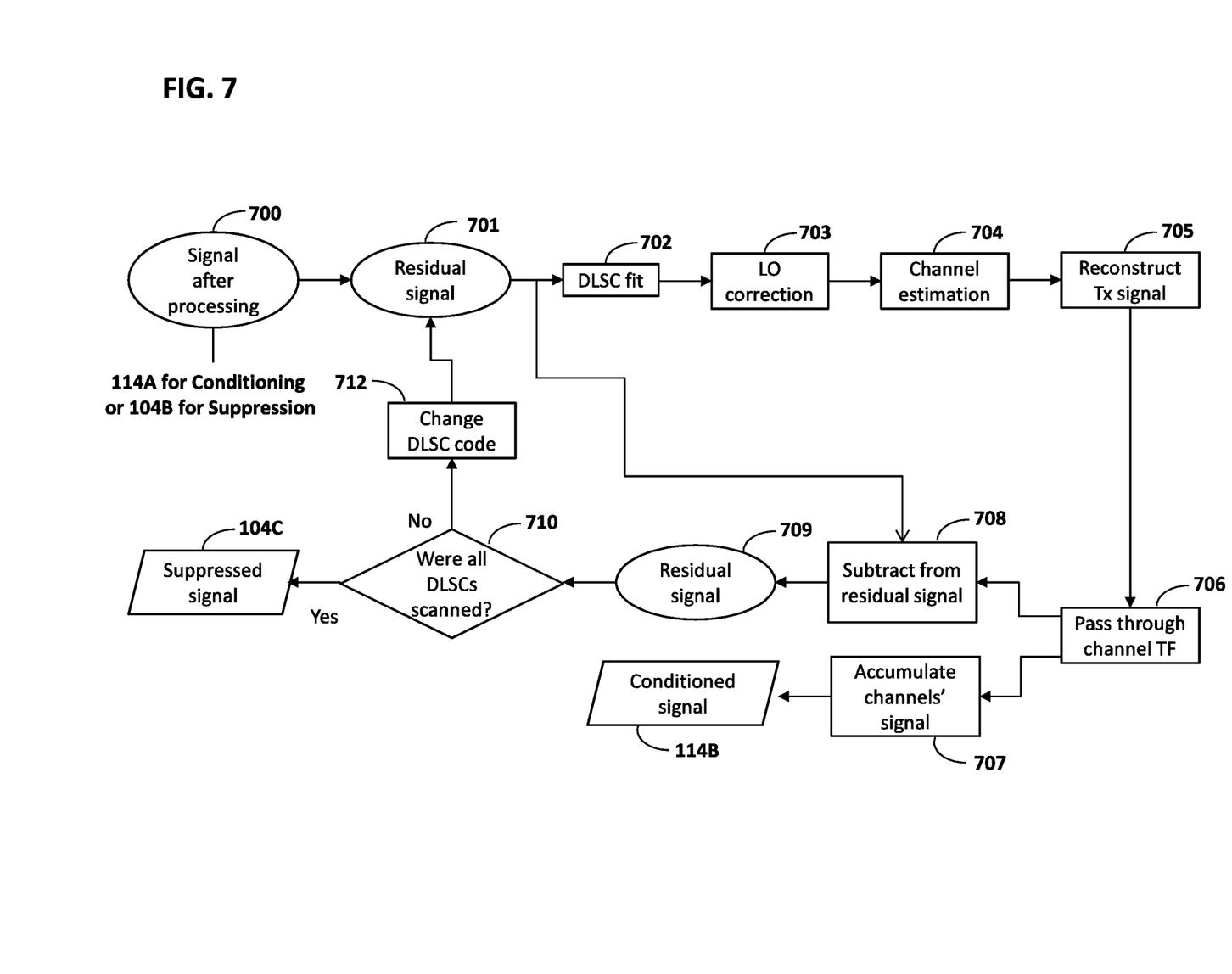
FIG. 7 is a flow chart of exemplary Conditioning and Suppression algorithms.

FIG. 7 illustrates a flow chart of one exemplary method according to the immediate invention. In order to mitigate the poor signal-to-interference ratio imposed by the frequency reuse of cellular communication frequencies (in UMTS and later generations), the conditioned signal is used as the reference, and the suppressed signal is used as the signal from the surveillance antenna.

The analysis of the refined (conditioned and suppressed) signals is performed using any of the known methods, such as, for example, the cross-ambiguity function. The refinement process is based on estimation or knowledge of each of the signals originally composing the transmitted signal. In one embodiment, this is done by averaging across individual symbols. A symbol is the minimal information unit conveyed by the communication signal, and is composed of consecutive chips having the same value. The number of chips in a symbol is the spreading factor SF. Each symbol has a constant (complex) value over a number of chips. As such, the process of estimating the value of a symbol can be reduced to the problem of estimating a DC level in complex additive noise.

Once each of the signals composing the received signal is estimated, the transmitted signal is reconstructed according to the scheme described in FIG. 7. This reconstruction represents the signal at the input of the cellular transmission source. Applying the transfer function of the medium between the transmitter input and the radar receiver output, gives an interference-free estimation of the transmitted signal.

FIG. 7 is a flow chart depicting the innovative reconstruction process of the immediate invention. The stages of the reconstructions process are described in the following sections. It is noted that the order of some of the blocks might be changed to address implementation aspects (for example, memory architecture), operations accuracy and the like. In one preferred embodiment of the invention, the suppressed signal is derived by conditioning (that is, reconstructing the refined signal) of each of the interfering signals one after the other, and subtracting the conditioned signals from the original one. In embodiments, the suppression process is repeated several times to suppress a number of interference signals. In preferred embodiments, the estimated transfer function of the channel is applied to each of the reconstructed components. Alternatively, the estimated transfer function of the channel is applied to the accumulated sum of all the reconstructed components.

FIG. 7 depicts a detailed description of Conditioning and Suppression algorithms. The input at 700 is an input signal after pre-processing (also termed "input residual signal"), i.e. either signal 114A for Conditioning or signal 104B for Suppression. The corresponding outputs are signal 114B for Conditioning or signal 104C for Suppression. The conditioning process is one pass 701 to 707 conducted on the intended REF cell DLSC. The suppression process takes multiple loops 701 to 709 for every detectable DLSC, starting from the strongest interferer to the weakest.

Block 702—DLSC fit. The objectives of the system at this stage are to verify the scrambling code of the received signal and to find the sample indices at which frames begin in the received signal. The DLSC (Down Link Scrambling Code) can be found by first detecting the PSC and the SSC and inferring the DLSC from the SSC sequence, or the DLSC can be dictated from an external knowledge base.

The DLSC of the interfering cell is determined. The DLSC fit block is based on fitting the DLSC to the signal, for example, by means of correlation (there are 8 possibilities of DLSC value per SSC sequence, and the one with the highest correlation is the true DLSC). The prototype DLSC is created using the algorithm known in the art. Next, the beginning of each frame is derived from the beginning of the sequence created by the SSC, and is fine-tuned by moving the prototype DLSC across the received signal, and the maxima of the correlation function between the received signal and the prototype DLSC are registered. These maxima are the indices of frame starts within the received signal.

It is known in the art that the performance of the DLSC fit block depends heavily on the Signal-to-Noise Ratio (SNR), and the accuracy of the Local Oscillator (LO). The SNR depends on the medium between the cellular base-station and the receiver including multipath and interferences. The accuracy of the LO depends on the alignment between the LO of the radar receiver and the LO of the base-station transmitter. The stability and performance of the radar clock generator are also important factors in the accuracy of the LO.

Block 703—LO correction. The frequency of the receiver Local Oscillator (LO) is corrected to obtain fine frequency set-on to the interfering cell carrier frequency. The objective of the system at this stage is to fine-tune the alignment between the Local Oscillator of the radar receiver, and the LO of the base-station receiver. As the transmitter and the receiver are separated, and work with different clock generators, a misalignment between the two LOs is inevitable.

In one exemplary embodiment, the LO correction is achieved by fitting a complex sinusoid to the Common Pilot Channel (CPICH) signal (or equivalent), and correcting the received signal by the estimated frequency of the fitted complex sinusoid. In other words, the proposed procedure for LO correction is as follows:

a. Descramble the signal (see stage 804 in the sequel).

b. Decimate the signal by averaging consequent samples. The number of samples to average is expressed by spreading factor X number of samples per chip which is derived from the sampling rate of the radar computer. For example, the spreading factor of the CPICH is 256, and assuming sampling rate dictating 2 samples per chip, the averaging is across segments of 512 (=segment length) samples. The segments first sample of the averaged samples should be synchronized with the first sample of the frame, that is, the first sample of a frame should be the first sample of one of the segments to be averaged.

c. Pass the signal through low-pass filter to remove high frequency noise, for example, half-band FIR filter of order 100.

d. Fit complex sinusoid to the result using any approximation method, for example using the Nelder-Mead simplex (direct search) method over the amplitude, frequency and phase parameters of the complex sinusoid.

e. Interpolate the estimated complex sinusoid to the length of the descrambled signal created in step 'a'.

f. Divide the descrambled signal created in step 'a' by the interpolated complex sinusoid created in step 'e'.

Block 704—The channel Transfer Function (TF) is estimated. The objective of this stage is to estimate the transfer function of the medium (often termed 'channel') between the input of the cellular base-station transmitter (or other transmission source) and the output of the radar receiver, so as to reconstruct the transmitted signal (for reconstruction of the components of the transmitted signal at the output of the radar receiver).

The components of the channel, which are depicted as including, for example, a base-station transmitter, a physical medium (including multipath) and a radar receiver. The channel can be modeled by an impulse response composed of the base-station transmitter, the physical medium including multipath, and the radar receiver.

The channel estimation might be performed in many ways, as are known to one skilled in the art. For example, one approach is to use the known DLSC as a pilot signal to estimate the channel. One of the control signals is the CPICH which is simply the DSLC, and is used for synchronization and phase matching. The perfect knowledge of the CPICH signal that was transmitted, facilitates Transfer Function Estimation (TFE), by comparing the prototype DLSC and the signal received by the radar. This is done, for example, by Wiener filter or any other TFE methods.

Block 705—Reconstruct original transmitter signal (also referred to herein as the 'source signal'). The active OVSF channels are determined, their symbols are estimated and are reconstructed to their form in source transmission signal at the down link transmit antenna. The reconstructed synchronizations are added. A complete reconstructed signal is obtained as the source transmission signal (or source signal) at the down link transmit antenna. Further details are discussed below in regard to FIG. 8.

Block 706—pass through channel TF. The reconstructed signal is transformed by TF to obtain clear estimate of the reference signal in case of conditioning operation and of the interfering signal in case of suppression operation from the cell of concern. The objective of this stage is to translate the reconstructed component at the input of the base-station transmitter (or other transmission source), to the output of the radar receiver. The objective is achieved by passing the scrambled, reconstructed component through the transfer function of the channel which was estimated at block 704.

Block 707: The generated signal becomes the reference signal for CAF.

Block 708: The generated signal is subtracted from the input residual signal to establish new residual signal (Block 709) for next DLSC interfering cell.

Block 710: Check whether all DLSCs have been scanned or used. To this end, an attempt to detect PSC, SSC is performed. IF found, another DLSC loop is performed. Go To Block 712. ELSE, the residual signal is the 104C output.

Block 712: Change DLSC code to unused/un-scanned DLSC and Go To Block 701.

Figure 8:
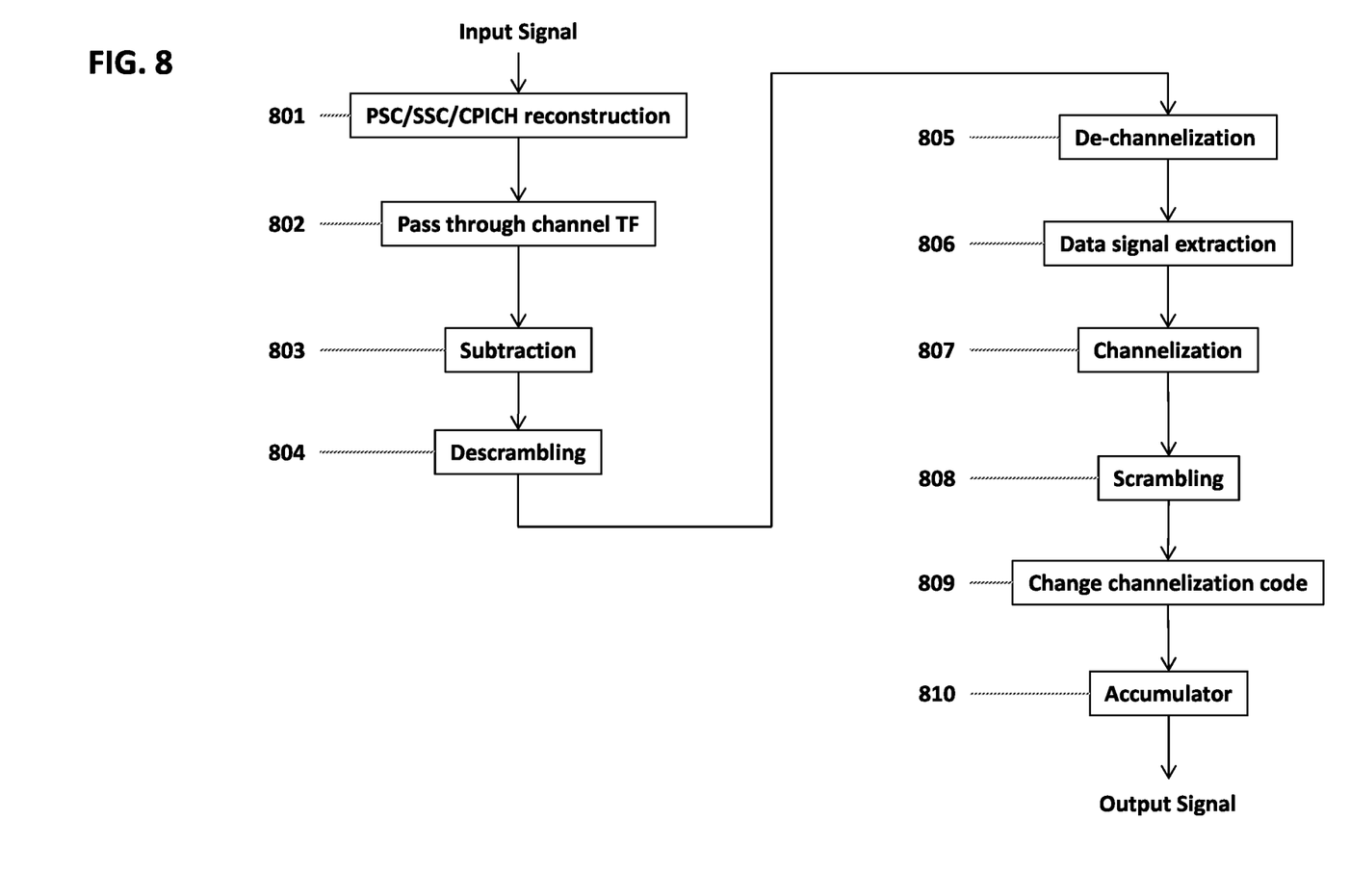
FIG. 8 is a flow chart for reconstructing the original transmitter signal.

FIG. 8 illustrates an exemplary flow chart for reconstructing the original transmitted (TX) signal (705).

Block 801—PSC/SSC/CPICH reconstruction. The objective of this stage is to reconstruct the three major components: PSC, SSC and CPICH. Reconstruction is performed similarly for each of the codes using the following steps:

First step, construct the code using the appropriate algorithm in the literature. The number of samples per chip should accord with the sampling rate;

Second step, synchronize the code with the received signal (input/residual signal) by locating the maximal correlation between the code and the received signal; and Third step, duplicate the code to the same length as the received signal.

Block 802—pass through channel TF. The objective of this stage is to translate the reconstructed component at the input of the base-station transmitter (or other transmission source), to the output of the radar receiver. The objective is achieved by passing the reconstructed components through the transfer function of the channel which was estimated at 704.

Block 803—subtraction. The objective of this stage is to subtract the reconstructed component which is estimated at the output of the radar receiver from the residual received signal.

Block 804—descrambling. The objective of this stage is to descramble the received signal, or the residual received signal. The descrambling process is as follow:

a. Construct the DLSC using the appropriate algorithm known in the art. The number of samples per chip should accord with the sampling rate;

b. Synchronize the DLSC with the received signal by locating the maximal correlation between the code and the received signal;

c. Duplicate the code to the same length as the received signal; and d. Element-wise multiply the received signal and the result of step 'c' to achieve the descrambled received signal.

Block 805—de-channelization (also known as 'Despreading'). The objective of this stage is to facilitate deciphering the data signal in the next stage, by chip-wise multiplying the received signal by the channelization code. There are many available channelization codes, not all of them are used all the time or at all. Therefore, the stages of the reconstruction of the signal components are repeated for each valid channelization code iteratively. Once the channelization code is selected, the following steps are taken:

a. Construct the channelization code using the appropriate algorithm known in the art. The number of samples per chip should accord/concur with the sampling rate;

b. Synchronize the channelization code with the received signal using the frame start that was derived as a byproduct of the descrambling stage;

c. Expand the code to the same length as the received signal; and d. Element-wise multiply the received signal and the result of step 'c' to have the de-channelized received signal.

Block 806—data signal extraction. The objective of this stage is to reconstruct the data signal associated with the channelization. After de-channelization (or dispreading), the despreaded signal is composed of equi-valued intervals (also known as 'symbols'), each is chip duration length multiplied by the index of the channelization code (also known as the 'spreading factor' or simply 'SF'). For example, if the system sampling rate is 2 samples per chip, a despreaded signal with SF of 128, is constructed from 2×128 samples long intervals/symbols. Also, as a byproduct, which is one of the chief advantages of the spreading/dispreading method, the signal power is typically a few decibels above the other signal components, interference and noise power.

Consequently, the data extraction stage is composed of the following steps:

a. For each symbol, estimate the value of the symbol by any method of estimating DC in a complex additive noise. For example, simple averaging across the symbol duration can yield sufficient performance under mild conditions on the statistics of the noise/interference;

b. Cluster the result of step 'a' and match the clusters with one of the expected constellations, and extract the amplitude of the signal. If the clustered constellation is too far from the expected constellation, this channelization code is classified as unused, and this stage is aborted; and c. Using the estimated amplitude, reconstruct the data symbols, by taking the closest value of the identified constellation for each of the estimated symbol value in step 'a'.

Block 807—channelization. The objective of this stage is to reconstruct the component signal associated with the channelization code. This is done by repeating the stage of block 805 with the same channelization code.

Block 808—scrambling. Scramble the spreaded reconstructed signal received in the previous stage by chip-wise multiplication of DLSC constructed in the stage of block 804.

Block 809—change channelization code. The stages pertaining to the reconstruction of the spreaded components 803-810 are repeated for all the valid channelization codes. However, often, only the highest channelization codes are used, or provide sufficient signal to interference ratio. In that case, the list of channelization codes over which this procedure is applied should be considered.

Block 810—accumulator. The objective of this stage is to accumulate the reconstructed signal components, such that at the end of the process, the accumulator contains an estimate of the transmitted signal at the input of the base-station transmitter.

While the invention has been described with respect to a limited number of embodiments, it will be appreciated that many variations, modifications and other applications of the invention may be made. Therefore, the claimed invention as recited in the claims that follow is not limited to the embodiments described herein.

Glossary

Unless specified otherwise, the terms and descriptions listed below are intended to clarify and compliment the common use and meaning of the terms in the art.

Reference source—this term includes all types of reference signal transmitters.

Reference signal—the signal from a reference source (e.g., base station, WiFi router etc.)

Reflected signal—the signal which is originally emitted from a reference source (e.g., Base station) and impinges on a target.

Components of signals (reference signal, reflected signal)—signals that are summed up by the source (e.g., base station) to create the reference signal, which might be control signals of the base station, signals carrying data, signals for synchronization, etc. A full description of these components depends on the communication protocol, and a list of these components can be found in the literature pertaining to each communication type (LTE, UMTS, Wifi, etc.).

Target—any object which is of interest to the user, such as drones, aircraft, people, vehicle, and terrain features.

Surveillance antenna—the antennas which are designed to capture the reflected signal from targets. The present system relates to a radar with, or using, receive channels only. Not transmission. Therefore, the term surveillance antenna means "the surveillance antenna and its receive channel". The block diagram of a receive channel is: antenna →analog front end→Analog to Digital Converter (ADC). "Output" refers to the output of the receive channel (which includes the ADC). That is, by artificially reconstructing the signal (as theoretically appears at the input of the transmit channel of the base station) and passing the signal through the estimated transfer function, thereby mimicking a situation of sampling (the ADC operation) the signal from the base-station with no interfering signals.

Interfering signal—signal from a different source to the reference source which is used for the bi-static radar operation, thereby having different scrambling code.

Interference—an operation of contaminating a desired signal by other signals by means of superposition of the interfering signal and the desired one.

Descrambling (spreading)—inverting the scrambling (spreading) operation in which the signal is element-wisely multiplied by a +1/−1 scrambling (spreading) code. Descrambling (dispreading) extracts the original signal by element-wisely multiplying the scrambled (spreaded) signal by the same scrambling (spreading) code.

Conditioning—enhancing a signal to prepare it for analysis.

Conditioned signal—the enhanced source signal which is free of contamination by the interfering signals.

Suppressed signal—the enhanced reflected signal which is free of contamination by the interfering signals.

Refined signal—refers interchangeably to conditioned and suppressed signals, as long as both are free from interferences. At times, the terms "refined reflected signal" and "refined reference signal" are used to distinguish between the two signals. At other times, the term is to be understood by the context in which it appears.

Reconstructing: this is a mathematical construct created by a computer processor.

Input residual signal: is the signal resulting from iteratively subtracting an estimation of the reference signal (by means of reconstruction and passing through the estimated transfer function of the medium) from the previous instance of the residual signal.

What is claimed is:

1. A method for detection of a target by a passive radar system exploiting multichannel-per-carrier cellular illuminator sources, the method comprising:
   receiving a reference signal from a reference source, said reference signal being received at a reference element of a radar receiver of the passive radar system, said reference source being a multichannel-per-carrier cellular communication source;
   receiving, at a surveillance element of said radar receiver, a reflected signal originating from said reference source and reflected off the target, said reflected signal including interference;
   deciphering components of said signals; and
   reconstructing said signals, from said components, excluding said interference;
   wherein said deciphering and reconstructing include:
   filtering said reference signal using Space Time Adaptive Processing (STAP) algorithms to receive a selective reference channel;
   applying a Conditioning algorithm to obtain a clean reference cell signal replica, with interfering signals and multipaths of said interfering signals removed, resulting in a conditioned signal;
   filtering said reflected signal using said STAP algorithms;
   removing direct interference from said reflected signal, with a Clean algorithm using said conditioned signal, said conditioned signal being passed through a filter representing a transfer function between said reference element and said surveillance element, and subtracting a resulting signal from said reflected signal; and
   reconstructing said surveillance signal by successively subjecting said reflected signal to at least one iteration of a Suppression algorithm, resulting in a refined reflected signal.

2. The method of claim 1, further comprising:
   performing a Cross Ambiguity Function (CAF) between a refined reference signal and said conditioned signal, resulting in a Range Doppler Image for every reception dwell;
   estimating the Angle of Arrival (AOA) of the target, in azimuth and elevation, using amplitude and phase of same pixel in different channels of said reflected signal, said estimating only being executed on pixels extracted by a Constant False Alarm Rate (CFAR) mechanism;
   applying a Track Before Detect (TBD) algorithm to the target;
   establishing Plot reports;
   obtaining location and velocity estimates; and
   displaying said plots.

3. The method of claim 1, wherein said Conditioning algorithm comprises the steps of:
   fitting a Down Link Scrambling Code (DLSC) to said reference signal;
   correcting a receiver Local Oscillator to an interfering cell carrier frequency;
   estimating a transfer function of a medium interposed between an input of a transmitter of said reference source and an output of said radar receiver of the passive radar system;
   reconstructing a source signal, said source signal being a signal originally transmitted from said reference source; and
   transforming said reconstructed source signal by said estimated transfer function, thereby obtaining an estimate of said reference signal, wherein said estimate is said conditioned signal.

4. The method of claim 3, wherein said DLSC is found by detecting a Primary Synchronization Code (PSC) and a Secondary Synchronization Code (SSC) and inferring said DLSC from said SSC sequence.

5. The method of claim 3, wherein said DLSC is dictated from an external knowledge base.

6. The method of claim 3, wherein reconstructing said source signal includes:
   determining active Orthogonal Variable Spreading Factor (OVSF) channels;
   estimating and reconstructing symbols of said channels; and
   adding reconstructed synchronizations.

7. The method of claim 1, wherein said Suppression algorithm comprises the steps of:
   fitting a Down Link Scrambling Code (DLSC) to said reference signal;
   correcting a receiver Local Oscillator to an interfering cell carrier frequency;
   estimating a transfer function of a medium interposed between an input of a transmitter of said reference source and an output of said radar receiver of the passive radar system;
   reconstructing a source signal, said source signal being a signal originally transmitted from said reference source;
   transforming said reconstructed source signal by said estimated transfer function, thereby obtaining an estimate of said interfering signal;
   subtracting said estimate of said interfering signal from an input residual signal in order to establish a new residual signal; and
   checking whether all DLSCs have been used, such that if all said DLSCs have been used, said new residual signal is said output of said radar receiver, otherwise, change DLSC to an unused DLSC and perform said Suppression algorithm again with said new residual signal.

8. The method of claim 7, wherein said reconstructing said source signal comprises:
   reconstructing a Primary Synchronization Code (PSC), a Secondary Synchronization Code (SSC) and a Common Pilot Channel (CPICH) by:
      constructing each of said PSC, SSC and CPICH using a known algorithm such that a number of samples per chip accords with a sampling rate, synchronizing each of said PSC, SSC and CPICH with said input residual signal or new residual signal by locating a maximal correlation between each of said PSC, SSC and CPICH and said received signal, and duplicating each of said PSC, SSC and CPICH to a same length of said residual signal;
      passing said reconstructed PSC, SSC and CPICH components through said estimated transfer function, in order to translate said reconstructed components at an input of said reference source to an output of said radar receiver;

subtracting said reconstructed signals, estimated at said output of said radar receiver, from said input residual signal; descrambling said received signal or said input residual signal;

despreading said received signal; extracting a data signal from said despreaded signal; reconstructing a component signal associated with a channelization code so as to receive a spreaded reconstructed signal;

scrambling said spreaded reconstructed signal by chip-wise multiplication of a DLSC constructed in said despreading step;

repeating reconstruction of said spreaded components for all valid channelization codes; and accumulating said reconstructed signal components so as to return an estimate of said source signal at said input of said reference source.

9. The method of claim 3, wherein said LO correction is achieved by fitting a complex sinusoid to a Common Pilot Channel (CPICH) signal or Pilot signal, and correcting said signal received from said interfering cell by an estimated frequency of said fitted complex sinusoid.

10. A passive radar system configured to exploit multi-channel-per-carrier cellular illuminator sources, the system comprising:

a radar receiver including:

a reference antenna element configured to receive a reference signal from a reference source, said reference source being a multichannel-per-carrier cellular communication source and a surveillance antenna element configured to receive a reflected signal originating from said reference source and reflected off a target, wherein said reflected signal includes interference; and a signal processor configured to analyze said received signals and perform and computations to decipher components of said received reference and reflected signals in order to identify said interference and reconstruct said signals from said components, without said interference;

wherein said deciphering and reconstructing include;

filtering said reference signal using Space Time Adaptive Processing (STAP) algorithms to receive a selective reference channel;

applying a Conditioning algorithm to obtain a clean reference cell signal replica, with interfering signals and multipaths of said interfering signals removed, resulting in a conditioned signal;

filtering said reflected signal using said STAP algorithms;

removing direct interference from said reflected signal, with a Clean algorithm using said condition signal, said conditioned signal being passed through a filter representing a transfer function between said reference element and said surveillance element, and subtracting a resulting signal from said reflected signal; and reconstructing said surveillance signal by successively subjecting said reflected signal to at least one iteration of a Suppression algorithm, resulting in a refined reflected signal.

11. The method of claim 7, wherein said LO correction is achieved by fitting a complex sinusoid to a Common Pilot Channel (CPICH) signal or Pilot signal, and correcting said signal received from said interfering cell by an estimated frequency of said fitted complex sinusoid.

* * * * *